United States Patent [19]

Keller

[11] 4,298,329
[45] Nov. 3, 1981

[54] SIZING MANDREL FOR THERMOPLASTIC NETTING

[75] Inventor: Charles T. Keller, Tonawanda, N.Y.

[73] Assignee: E. I. Du Pont de Nemours and Company, Wilmington, Del.

[21] Appl. No.: 153,206

[22] Filed: May 27, 1980

[51] Int. Cl.³ ............................................. A01J 21/02
[52] U.S. Cl. ............................ 425/382 N; 264/167; 425/468
[58] Field of Search ............................ 425/468, 382 N; 264/167

[56] References Cited

U.S. PATENT DOCUMENTS

| | | | |
|---|---|---|---|
| 2,919,467 | 1/1960 | Mercer | 425/382 N |
| 3,067,084 | 12/1962 | Nalle | 425/382 N |
| 3,193,604 | 7/1965 | Mercer | 425/382 N |
| 3,234,071 | 2/1966 | Ward et al. | 425/382 N |
| 3,477,892 | 11/1969 | Plymale | 425/382 N |
| 3,560,306 | 2/1971 | Nalle | 425/382 N |
| 3,616,080 | 10/1971 | Nalle | 425/382 N |
| 3,819,451 | 6/1974 | Nalle | 425/382 N |
| 3,957,565 | 5/1976 | Livingston et al. | 425/382 N |
| 4,083,667 | 4/1978 | Livingston et al. | 425/382 N |

Primary Examiner—Jay H. Woo

[57] ABSTRACT

Mandrel for sizing thermoplastic netting having a cylindrical forming element divided into at least two radial sections retained by circumferential bands and an internal adjusting mechanism including a slidable conical element positioned to outwardly expand the radial sections of the forming element.

3 Claims, 3 Drawing Figures

SIZING MANDREL FOR THERMOPLASTIC NETTING

Thermoplastic netting has long been prepared by the extrusion of two sets of streams of thermoplastic material through counter-rotating dies, the sets of streams intersecting at regular intervals with the rotation of the dies. A preparation of such thermoplastic netting is described, for example, in Mercer U.S. Pat. No. 2,919,467.

The netting formed in this manner, while capable of production as a flat material, is most often prepared in the form of a tube. Such tubes can be slit to form a flat sheet, or typically, are used in tubular form for packaging and other applications.

More recently, heavier gauge thermoplastic netting has been used to prepare rigid tubes. Such tubes are well suited, for example, for use as seedling protectors. The rigid tube of plastic netting can be placed around a freshly planted seedling to protect it against damage by animals.

In the production of such rigid tubes, it is desirable to prepare several different sizes, so that five or more different size tubes can be nested to minimize handling required by the end user, and increase bulk density for shipping.

A number of different sized tubes can generally be prepared from a single extrusion die by varying the size of the mandrel over which the tube is passed for forming after extrusion. However, changes in size have heretofore necessitated stoppage of the extrusion equipment for changing sizing mandrels, or, in the alternative, operating several sets of equipment, each having a different diameter of sizing mandrel.

SUMMARY OF THE INVENTION

The instant invention provides a sizing mandrel which can be adjusted in use to produce a variety of sizes of thermoplastic netting.

Specifically, the instant invention provides a mandrel for sizing extruded cylinders of thermoplastic netting flowing downstream to the mandrel from an upstream extrusion die, the mandrel comprising a hollow tube of substantially circular cross-section having at least one longiudinal aperture formed therein and a transverse guide means attached thereto at a position upstream from the longitudinal aperture, a rod slidably positioned within the tube, the rod having a conical element rigidly connected thereto exterior to the tube and through the longitudinal aperture in the tube, the apex of the conical element being in the upstream position, the mandrel further comprising an exterior cylindrical forming element of at least two radial sections positioned around and slidably engaged with the guide means and the conical element, the radial sections being retained by at least two circumferential expandable bands.

DETAILED DESCRIPTION OF THE INVENTION

The present invention is broadly applicable to the production of thermoplastic netlike structures, as described in the aforementioned U.S. Pat. No. 2,919,467 to F. B. Mercer, hereby incorporated by reference. The extrusion mandrel of the present invention is positioned immediately downstream from the extrusion die orifice so as to aid in the sizing of the extruded thermoplastic net while it is still in a plastic state. The forming mandrel optionally can be submerged in a quench medium.

Figure 1:
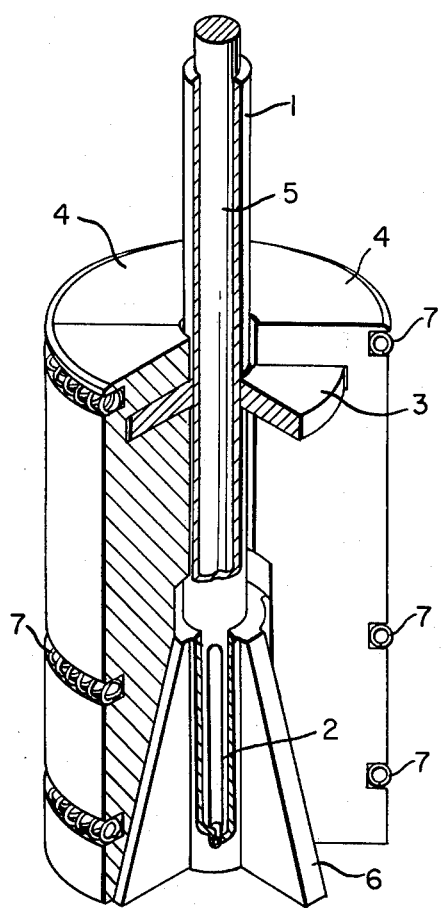
FIGS. 1 and 2 are partial cross-sectional views of mandrels of the present invention in the contracted and expanded positions, respectively.

With reference to the figures, FIG. 1 is a partially cross-sectional illustration of the apparatus of the present invention. In that figure, hollow tube 1 has longitudinal aperture 2 formed therein. The tube has transverse guide means 3 attached thereto to provide a positioning means for forming element 4. In his embodiment, the guide means is a circular flange. While the hollow tube is preferably circular in cross-section, other cross-sectional configurations, such as oval or polygonal, can also be used. The forming element is cylindrical in configuration, and is divided into at least two radial sections. In this illustration, with about one-third of the cylindrical forming element cut away, the element is divided into four sections.

Slidably positioned within the tube is adjusting rod 5. The rod has connected thereto, through aperture 2, conical element 6. The function of the conical element is, upon adjustment, to force the radial sections of the forming element outward so as to expand the overall nominal diameter of the forming mandrel. The conical element can, as illustrated in this figure, be vaned to provide the required conical configuration, or it can be in the form of a full cone.

The radial sections of the forming element are slidably positioned around transverse guide means 3 and preferably are partially hollowed in configuration so as to accommodate the conical element 6.

With upstream adjustment of rod 5 and the corresponding upstream movement of attached conical element 6, the radial sections of the cylindrical forming element are expanded outwardly to provide a greater diameter. The forming elements are retained by circumferential expandable bands 7, which contract the radial sections of the cylindrical forming element with downstream adjustment of rod 5.

Figure 2:
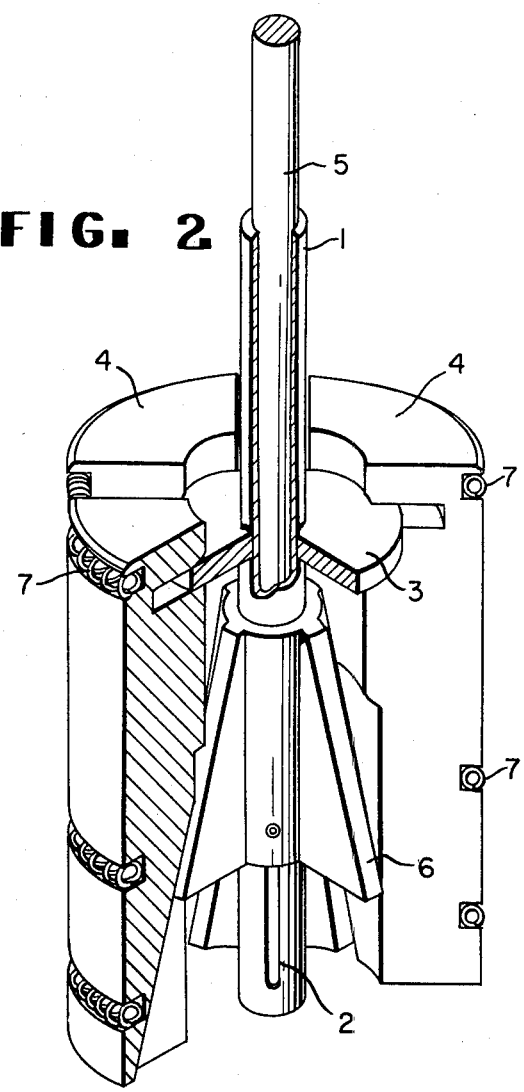

FIG. 2 is a similar illustration of the mandrel of the present invention, shown in its expanded position with the rod in its nearly fully upstream position of adjustment. Conical element 6 has forced the radial sections of the forming element 4 outward, to provide a greater overall diameter for the sizing mandrel.

Figure 3:
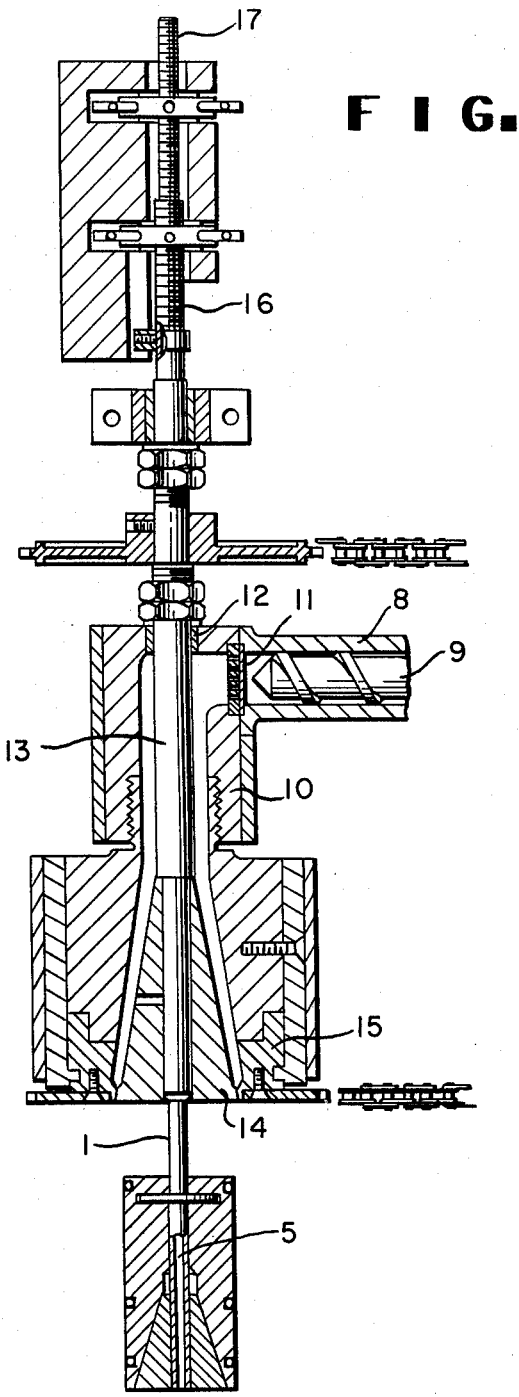
FIG. 3 is a partial cross-sectional illustration of a mandrel of the present invention shown in conjunction with an extrusion apparatus for thermoplastic netting which can be used with the mandrels of the present invention.

In FIG. 3, the mandrel of the present invention is shown in conjunction with an extrusion apparatus typically used in the preparation of thermoplastic netting. In this extrusion apparatus, molten polymer is fed through conduit 8 in which a pressure worm 9 is mounted and continuously rotated. The molten polymer is thus forced first into feed chamber 10 through a gauze screen and breaker plate 11. The upper end of the chamber 10 has a bearing 12 which accommodates the rotatable shaft 13 and the adjusting means for the sizing mandrel. The molten polymer is extruder through the orifice formed by counter-rotating die elements 14 and 15.

In the adjustment of the sizing mandrel, the position of the entire mandrel can be adjusted by movement of threaded shaft 16, which is continuous with hollow tube 1 of the mandrel. The diameter of the mandrel can be adjusted by movement of threaded element 17, which is continuous with rod 5 positioned within tube 1.

The instant apparatus, in operation, permits the manual or automatic adjustment of the diameter of thermoplastic netting produced in tubular form without the inconvenience and expense of changing forming mandrels.

I claim:

1. A mandrel for sizing extruded cylinders of thermoplastic netting flowing downstream to the mandrel from an upstream extrusion die, the mandrel comprising a hollow tube of substantially circular cross-section having at least one longitudinal aperture formed therein and a transverse guide means attached thereto at a position upstream from the longitudinal aperture, a rod slidably positioned within the tube, the rod having a conical element rigidly connected thereto exterior to the tube and through the longitudinal aperture in the tube, the apex of the conical element being in the upstream position, the mandrel further comprising an exterior cylindrical forming element of at least two radial sections positioned around and slidably engaged with the guide means and the conical element, the radial sections being retained by at least two circumferential expandable bands.

2. A sizing mandrel of claim 1 wherein the cylindrical forming element has at least three radial sections.

3. A sizing mandrel of claim 1 wherein the conical element is a vaned tube.

* * * * *